March 20, 1962  C. K. JUDD, JR  3,026,153
BALL AXLE ASSEMBLY
Filed June 16, 1958
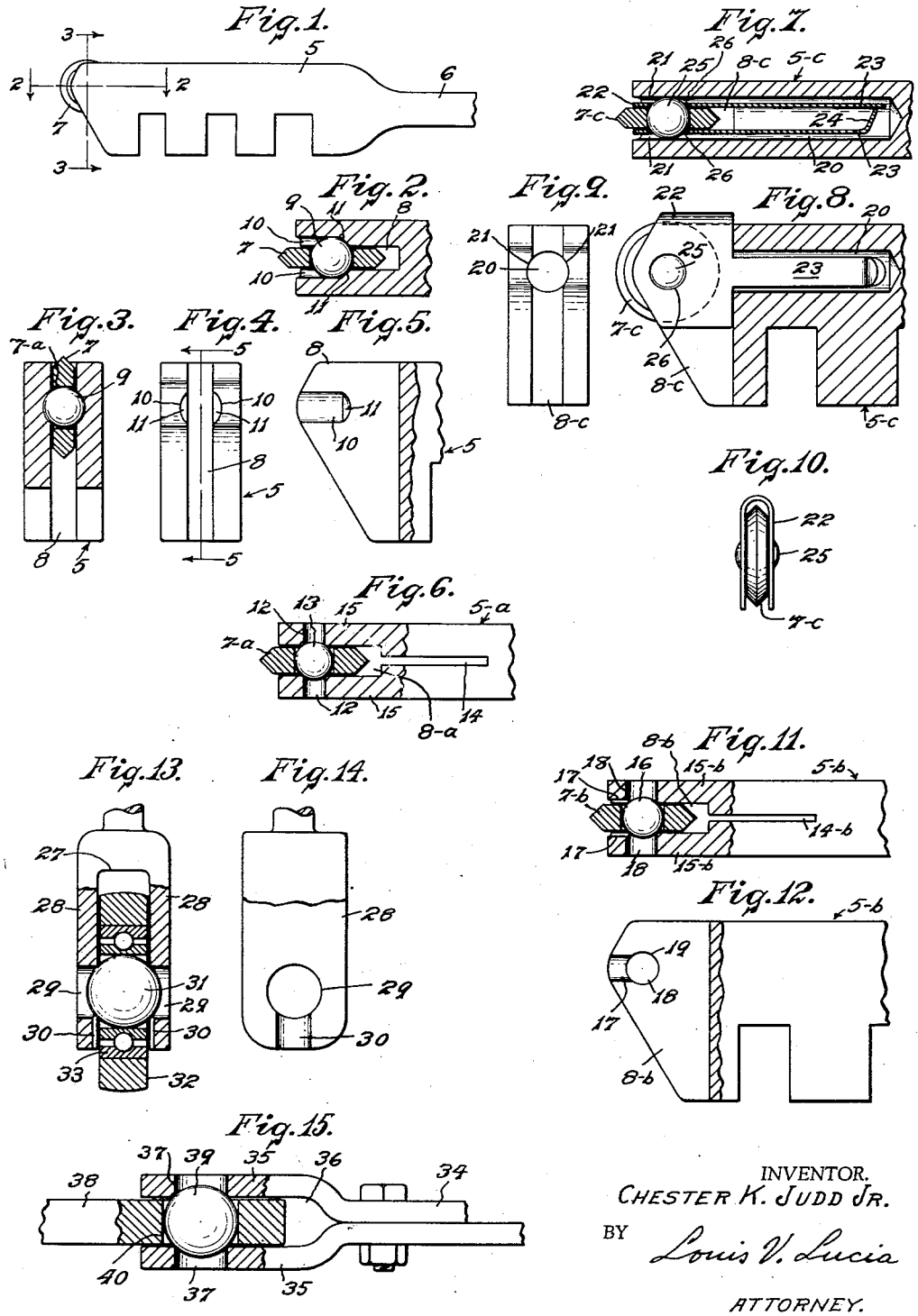
INVENTOR.
CHESTER K. JUDD JR.
BY Louis V. Lucia
ATTORNEY.

United States Patent Office 3,026,153
Patented Mar. 20, 1962

1

3,026,153
BALL AXLE ASSEMBLY
Chester K. Judd, Jr., Bristol, Conn., assignor to The Fletcher-Terry Company, Forestville, Conn., a corporation of Connecticut
Filed June 16, 1958, Ser. No. 742,188
12 Claims. (Cl. 308—18)

This invention relates to a ball axle assembly and more particularly to a novel axle assembly for supporting the rotatable member of such devices as glass cutters, casters, rollers, swivel links and the like.

An object of the present invention is to provide a unique and quickly mountable axle assembly for rotatably supporting a separate member such as a glass cutter wheel, a caster wheel, a roller or the like.

A further object of this invention is to provide a novel and simple construction whereby a single ball in the shape of a perfect sphere may be used as an axle for rotatably supporting a separate member.

Further objects and advantages of the present invention will be more clearly understood from the following description and the accompanying drawing in which:

FIG. 1 is a side view of a glass cutter head in which the present invention is incorporated.

FIG. 2 is an enlarged sectional plan view on line 2—2 of FIG. 1.

FIG. 3 is a sectional end view on line 3—3 of FIG. 1.

FIG. 4 is an end view of said glass cutter head with the cutter wheel removed therefrom.

FIG. 5 is a sectional side view on line 5—5 of FIG. 4.

FIG. 6 is a sectional plan view showing a modified form of glass cutter head embodying the present invention.

FIG. 7 is a sectional plan view showing a portion of the head of another modified form of glass cutter embodying the present invention.

FIG. 8 is a side view, partly in central vertical section, of the glass cutter head shown in FIG. 7.

FIG. 9 is an end view of the glass cutter head shown in FIG. 8 with the cutter wheel unit removed therefrom.

FIG. 10 is an end view of the cutter wheel unit shown in FIGS. 7 and 8.

FIG. 11 is a sectional plan view showing a further modified form of glass cutter head embodying the present invention.

FIG. 12 is a side view, partly in central vertical section, of the glass cutter head shown in FIG. 11 with the cutter wheel removed therefrom.

FIG. 13 is a front view, partly in central vertical section, showing a caster embodying the present invention.

FIG. 14 is a side view of said caster, partly in central vertical section, with the wheel thereof removed.

FIG. 15 is a plan view, partly in central horizontal section, showing a swivel link embodying the present invention.

My invention is particularly intended for use in glass cutters, and in FIGS. 1 to 5 of the drawing, I have illustrated a glass cutter of well known form comprising a head 5 having a suitable handle portion 6 extending therefrom. A glass cutting wheel 7 of conventional form is rotatably mounted in a slot 8 in said head that is slightly wider than the thickness of said cutting wheel.

In accordance with the present invention, I provide a novel and improved axle for rotatably mounting said glass cutting wheel. Said axle is in the form of a ball 9 that is entirely spherical and fits into an axial hole 7–a in the cutter wheel. The ball 9 is larger than the thickness of the cutter wheel and therefore extends beyond the opposite sides of said wheel when mounted in said hole 7–a. In the form illustrated in FIGS. 1 to 5,

2 the ball 9 is seated in opposed grooves 10—10 in the opposite sides of the slot 8 which extend inwardly from the end of the head 5 for the required distance to properly contain the cutting wheel. Said grooves 10—10 are readily formed by drilling a hole longitudinally into the head 5 either before or after the slot 8 is formed therein. The drill bit used is preferably of a slightly smaller diameter than that of the ball 9 so that, in assembling the cutting wheel and ball to the cutter head, the ball must be forced into the grooves 10—10 until it seats against the shoulders 11—11 which are provided at the inner ends of said grooves and is frictionally held in assembled position by the inherent resiliency of the portions of the head 5 at the opposite sides of the slot 8. In the use of this form of my invention, the cutting wheel rotates on the ball 9 and the thrust on the wheel and the ball is taken up by the shoulders 11—11.

In the form illustrated in FIG. 6, the head 5–a is provided with coaxial holes 12—12 at opposite sides of the slot 8–a and said holes are of a size to receive the portions of the ball 13 which project beyond the opposite sides of the cutting wheel 7–a, the said ball being slightly larger in diameter than the width of said slot 8–a, but smaller than the ball 9 of FIGS. 1 to 5. The head 5–a has a slit 14 extending inwardly from the bottom of the slot 8–a which increases the resiliency of the projecting portions 15—15 of said head and thereby allows said portions to open as the ball 13 is pushed into said slot and to spring back to normal position as said ball enters the holes 12—12 to thereby securely hold the ball 13 in the position shown for rotatably supporting the cutting wheel 7–a.

In the form of the invention illustrated in FIGS. 11 and 12, the ball 16 is slightly larger in diameter than the ball 13 of FIG. 6. The opposite sides of the slot 8–b are provided with grooves 17—17 which lead into the holes 18—18 and are formed by a drilling operation with a drill bit that is substantially smaller than the diameter of the ball 16. In this form, the head 5–b is also slit at 14–b to render the projecting portions 15–b—15–b more resilient. When the cutter wheel 7–b is assembled to this form of head, the ball 16 is pushed through the grooves 17—17 until it enters the holes 18—18, whereupon the portions 15–b—15–b will close and the ball will rest in engagement with the peripheral edge 19 of each hole. It will be noted from FIG. 12, that the width of the grooves 17—17 is less than the diameter of the holes 18—18 so that the peripheral edge 19 of each hole will extend around more than one-half of its circumference and the ball 16 is thereby retained against outward movement through the grooves 17—17 by the forward portions of said peripheral edges while the thrust against said ball is taken up by the rear portions of said edges.

In the form illustrated in FIGS. 7 to 10, the head 5–c is provided with a hole 20 which is of a diameter larger than the width of the slot 8–c so that grooves 21—21 are formed in the opposite sides of said slot. The cutting wheel 7–c is rotatably mounted in a detachable holder having a U-shaped body portion 22 which rests against the bottom of the slot 8–c and has legs 23—23 extending therefrom and adapted to fit into the hole 20. One of said legs is preferably bent, as at 24, in order to keep the said legs separated for frictional engagement with the sides of said hole 20 to retain the holder in position. The U-shaped body portion 22 is also adapted to fit snugly in the slot 8–c for frictional engagement with the sides thereof. In this form, the ball 25 is of a diameter which will provide a sliding fit in the grooves 21—21 and projects through holes 26—26 in the opposite sides of the U-shaped body portion 22 and beyond the outer surfaces of said portions so that it will extend into said grooves 21—21. The thrust on said ball 25 is taken up by the edges of the holes 26—26 and any side thrust applied to said ball will be taken up by the grooves 21—21.

In the form illustrated in FIGS. 13 and 14, my present invention is embodied in a caster which includes a U-shaped frame having a slot 27 therein forming side portions 28—28 and coaxial holes 29—29 extend transversely through said side portions. Grooves 30—30 are formed in the opposite sides of the slot and lead into said holes 29—29. Said grooves are preferably formed with a drill bit that is of a slightly smaller diameter than the ball 31 so that when the ball is forced into position through the grooves 30—30 the side portions 28—28 will spring apart. Then, when the ball reaches its position in the holes 29—29, the said sides will close and the ball will be retained against the peripheral edge portions of the said holes. In this form of the invention, the ball 31 provides an axle for the caster wheel 32 which is preferably rotatably mounted upon said ball by means of a suitable anti-friction bearing 33.

In the form illustrated in FIG. 15, a yoke 34 has projecting arms 35—35 with a slot 36 therebetween and coaxial holes 37—37 extending transversely through said arms. A member 38 is swivelly connected to said yoke by means of a ball 39 which is disposed within a hole 40 in said member 38 and projects from the opposite sides thereof so that it extends into the holes 37—37 and is supported against thrust in any direction by the peripheral inner edges of said holes.

It will be understood from the above description that my invention provides a simple and inexpensive axle assembly using only a single ball which is disposed within an axial hole in a member and is of a diameter to project from opposite sides of said member so that opposite portions of said ball will seat against a supporting surface in a holder or frame and thereby provide a durable and inexpensive axle for said rotatable member.

I claim:

1. An axle assembly, comprising a relatively fixed member, a rotatable member, said rotatable member having an axial hole therein, an entirely spherical ball disposed within said axial hole, said ball projecting from opposite sides of the hole, a pair of opposed faces on said fixed member defining a slot for receiving said rotatable member, and means associated with said opposed faces for receiving and holding the projecting portions of said ball.

2. An axle assembly, comprising a relatively fixed member, a rotatable member, said rotatable member having an axial hole therein, an entirely spherical ball disposed within said axial hole, said ball projecting from opposite sides of the hole, a pair of opposed faces on said fixed member defining a slot for receiving said rotatable member, the said opposed faces having recesses therein for receiving and holding the projecting portions of said ball.

3. An axle assembly, comprising a relatively fixed member, a rotatable member, said rotatable member having an axial hole therein, an entirely spherical ball disposed within said axial hole, said ball projecting from opposite sides of the hole, a pair of opposed faces on said fixed member defining a slot for receiving said rotatable member, and means in said opposed faces providing abutments for engaging and holding the projecting portions of said ball.

4. An axle assembly, comprising a relatively fixed member, a rotatable member, said rotatable member having an axial hole therein, an entirely spherical ball disposed within said axial hole, said ball projecting from opposite sides of the hole, a pair of opposed faces on said fixed member defining a slot for receiving said rotatable member, the said opposed faces having grooves therein for receiving and holding the projecting portions of said ball.

5. A structure as set forth in claim 4, wherein the ends of said grooves provide abutments engageable with the projecting portions of the ball for resisting thrust applied against said ball.

6. An axle assembly, comprising a relatively fixed member, a rotatable member, said rotatable member having an axial hole therein, an entirely spherical ball disposed within said axial hole, said ball projecting from opposite sides of the hole, a pair of opposed faces on said fixed member defining a slot for receiving said rotatable member, said opposed faces having coaxial holes extending therethrough transversely of said slot and of a diameter to receive and hold the projecting portions of said ball.

7. A structure as set forth in claim 6 wherein said opposed faces are provided with opposed grooves leading into said holes, the space between the bottoms of said grooves being less than the diameter of said ball whereby said opposed faces are separated when said ball is forced through said grooves and then close when the projecting portions of said ball enter said holes.

8. An axle assembly, comprising a relatively fixed member, a rotatable member, said rotatable member having an axial hole therein, an entirely spherical ball disposed within said axial hole, said ball having a diameter greater than the thickness of said rotatable member whereby said ball projects from opposite sides of said hole, a pair of opposed faces on said fixed member defining a slot for receiving said rotatable member, and means associated with said opposed faces for receiving and holding the projecting portions of said ball.

9. An axle assembly, comprising a relatively fixed member, a rotatable member, said rotatable member having an axial hole therein, an entirely spherical ball disposed within said axial hole and projecting from the opposite sides thereof, a pair of opposed faces on said fixed member defining a slot for receiving said rotatable member, said ball having a diameter slightly larger than the width of said slot, said opposed faces having recesses therein for receiving and holding the projecting portions of said ball.

10. An axle assembly, comprising a relatively fixed member, a rotatable member, said rotatable member having an axial hole therein, an entirely spherical ball disposed within said axial hole, said ball projecting from opposite sides of said hole, a pair of opposed faces on said fixed member defining a slot for receiving said rotatable member, said opposed faces having recesses for receiving the projecting portions of said ball and providing abutments for supporting said ball in position in said slot, the space between the bottom surfaces of said recesses being slightly less than the diameter of said ball whereby said ball is retained in frictional engagement with said surfaces.

11. An axle assembly, comprising a relatively fixed member, a rotatable member, said rotatable member having an axial hole therein, an entirely spherical ball disposed within said axial hole, said ball projecting from opposite sides of the hole, a pair of opposed faces on said fixed member defining a slot for receiving said rotatable member, a detachable member having a U-shaped portion adapted to fit within said slot, the opposite legs of said U-shaped portion having coaxial holes therein, the said holes receiving and holding the projecting portions of said ball.

12. An axle assembly, comprising a relatively fixed member, a rotatable member, said rotatable member having an axial hole therein, an entirely spherical ball disposed within said axial hole, said ball projecting from opposite sides of the hole, a pair of opposed faces on said fixed member defining a slot for receiving said rotatable member, a detachable member having a U-shaped portion adapted to fit within said slot, the opposite legs of said U-shaped portion having coaxial holes extending therethrough, said faces having opposed recesses therein, the projecting portions of said balls extending through said coaxial holes and into said recesses.

References Cited in the file of this patent

UNITED STATES PATENTS

| | | | |
|---|---|---|---|
| 526,013 | Howard | Sept. 11, | 1894 |
| 896,089 | Denton | Aug. 18, | 1908 |
| 1,020,776 | Parry et al. | Mar. 19, | 1912 |
| 1,201,515 | Sidon | Oct. 17, | 1916 |
| 1,483,302 | Hanna | Feb. 12, | 1924 |
| 1,895,311 | Clark | Jan. 24, | 1933 |
| 2,028,394 | Kay | Jan. 21, | 1936 |
| 2,096,284 | Lee | Oct. 19, | 1937 |
| 2,341,030 | Fletcher | Feb. 8, | 1944 |
| 2,652,659 | Fletcher | Sept. 22, | 1953 |